(12) United States Patent
Pietraszkiewicz et al.

(10) Patent No.: US 7,413,406 B2
(45) Date of Patent: Aug. 19, 2008

(54) TURBINE BLADE WITH RADIAL COOLING CHANNELS

(75) Inventors: Edward F. Pietraszkiewicz, Southington, CT (US); Om P. Sharma, South Windsor, CT (US); Kar D. Chin, Simsbury, CT (US)

(73) Assignee: United Technologies Corporation, East Hartford, CT (US)

( * ) Notice: Subject to any disclaimer, the term of this patent is extended or adjusted under 35 U.S.C. 154(b) by 193 days.

(21) Appl. No.: 11/355,278

(22) Filed: Feb. 15, 2006

(65) Prior Publication Data

US 2007/0189897 A1 Aug. 16, 2007

(51) Int. Cl.
*F01D 5/18* (2006.01)

(52) U.S. Cl. .................... 416/96 R; 416/97 R

(58) Field of Classification Search .......... 416/92, 416/90 R, 96 R, 97 R
See application file for complete search history.

(56) References Cited

U.S. PATENT DOCUMENTS

| 4,626,169 | A | * | 12/1986 | Hsing et al. | 416/95 |
| 6,997,679 | B2 | | 2/2006 | Beddar | |
| 2002/0028140 | A1 | * | 3/2002 | Jacala | 416/96 R |
| 2006/0062671 | A1 | * | 3/2006 | Lee et al. | 416/92 |

* cited by examiner

*Primary Examiner*—Edward K. Look
*Assistant Examiner*—Dwayne J White
(74) *Attorney, Agent, or Firm*—Kinney & Lange, P.A.

(57) ABSTRACT

A turbine blade is cooled by cooling air that flows through a radial cooling channel. The turbine blade includes a root and an airfoil. The flow of cooling air into the cooling channel is limited by a pre-meter orifice to provide a reduced pressure within the cooling channel. The pressure drop results from the cross-sectional area of the pre-meter orifice being less than the cross-sectional area of the adjacent cooling channel. After flowing through the cooling channel, the cooling air exits the cooling channel through a film hole to form a film layer over the airfoil to cool and insulate the turbine blade.

20 Claims, 4 Drawing Sheets

TURBINE BLADE WITH RADIAL COOLING CHANNELS

BACKGROUND OF THE INVENTION

The present invention relates to gas turbine engines, and more particularly to cooled turbine blades for a gas turbine engine.

Gas turbine engines, such as an axial-flow turbine engine, include rotor assemblies with a rotating disk and a number of rotor blades circumferentially disposed around the disk. Rotor blades include a root portion for engaging with the disk and an airfoil portion for positioning within the gas path of the engine. The temperature within this gas path is very high, resulting in the heating of the rotor blades. If the rotor blades become too hot, the durability of the airfoil will be adversely affected. Therefore, various methods of cooling turbine blades have been used to improve the longevity and durability of the turbine blades.

One method of cooling rotor blades is known as simple radial flow film cooling. In this method, internal passages are formed in the rotor blade by drilling straight holes from the base to the tip. The internal passages are cylindrical passages having a single diameter from base to tip, due to the fact that they are formed by drilling. Film holes are then drilled through the side walls of the rotor blade to adjoin with the internal passages. Cooling air is then forced through the passages, which flows out of the film holes. Cooling occurs both as the cooling air passes through the internal passages, and also as it flows out and around the turbine blade. Simple radial flow film cooling was largely abandoned because the method resulted in the release of too much cooling air into the engine. It is undesirable to overcool the engine, because cooling air reduces the pressure within the engine, thereby decreasing the efficiency and thrust of the engine.

To alleviate this problem, airfoil designs began to include complex internal passageways such as serpentine designs. In these airfoils, internal passages were formed to direct cooling air first from the base to the tip of the airfoil. The passage would then turn sharply to direct the cooling air from the tip back to the base. The passage would then turn again directing the cooling air back toward the tip, and so on until it had gone through the entire serpentine passageway.

Serpentine designs present numerous problems. One of the challenges is the difficulty of predicting and modeling the air flow and pressure distribution through a serpentine system while it is rotating. In particular, rotational forces resist the flow of cooling air in the direction from the tip to the base of the airfoil. Predicting and modeling the precise effect of the rotational forces on the cooling air is very difficult. In order to overcome the rotational forces resisting the flow of cooling air from the tip to the base of the airfoil, a sufficient pressure must be present at the tip of an internal passage to force the air back down to the base of the airfoil. If sufficient pressure is not present, cooling air will not flow through the desired serpentine path, resulting in inadequate cooling of the turbine blade.

Furthermore, insufficient pressure within the cooling channel can result in backflow. Backflow occurs when hot gases from the gas path flow into film holes of the airfoil, rather than cooling air flowing out. This leads to undesired heating of the turbine blade. On the other hand, if too much cooling air is present in the cooling channels, too much cooling air will escape from the film holes, resulting in overcooling of the engine.

BRIEF SUMMARY OF THE INVENTION

Turbine blades of a gas turbine engine can be effectively cooled by utilizing radially extending cooling channels that feed a plurality of film holes. An amount of cooling air passing through the cooling channels is controlled by pre-meter orifices located at one end of the cooling channels. The pre-meter orifices have a cross-sectional area that allows enough cooling air to pass into the cooling channel to adequately cool the turbine blade, but also limits the flow of cooling air so as to not overcool the engine.

DETAILED DESCRIPTION

Figure 1:
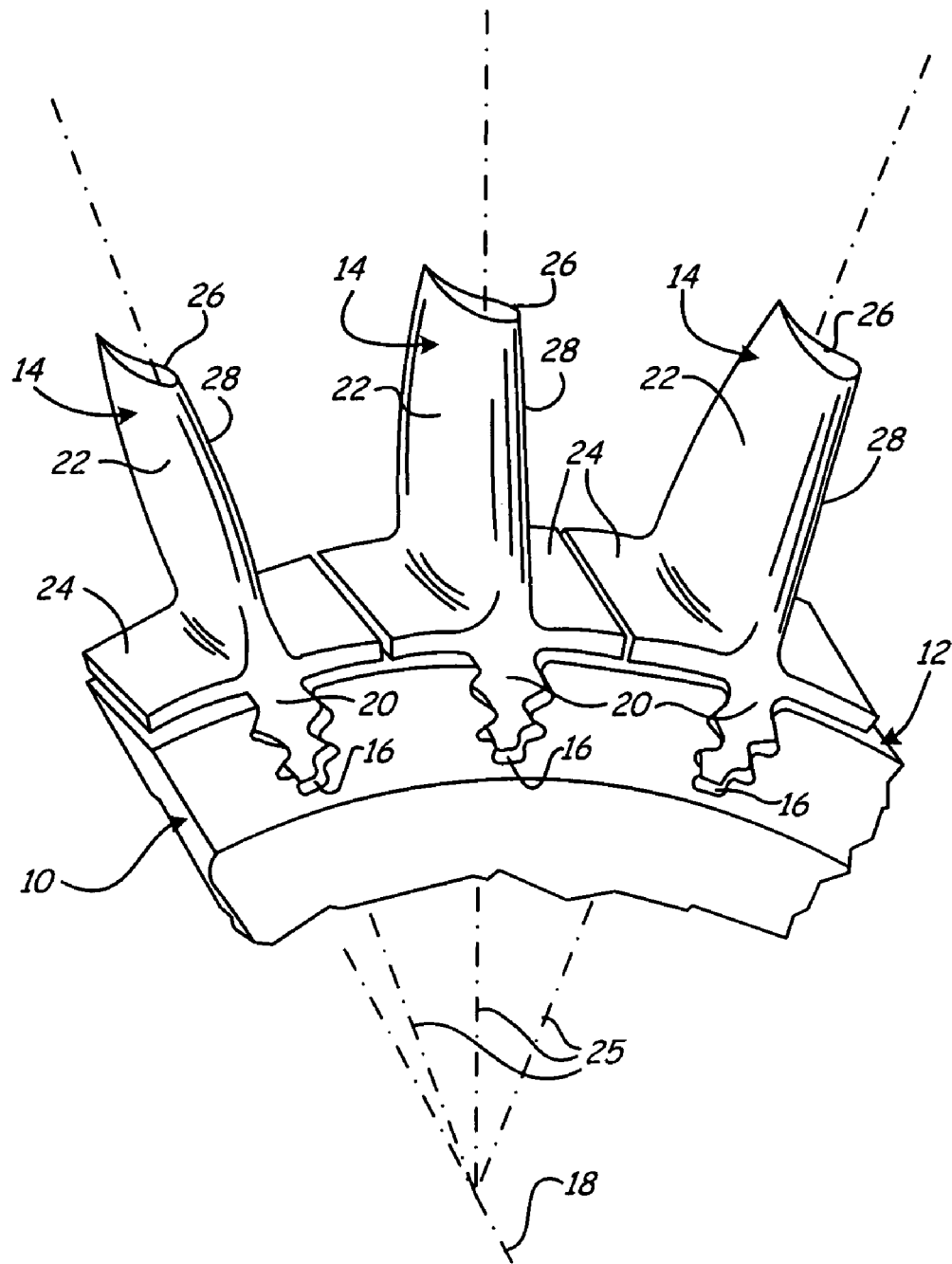
FIG. 1 is a perspective view of a turbine rotor assembly.

FIG. 1 is a perspective view of turbine rotor assembly 10 of a gas turbine engine. Turbine rotor assembly 10 includes disk 12 and turbine blades 14. Disk 12 includes a plurality of recesses 16 circumferentially disposed around disk 12 and a rotational centerline 18 about which disk 12 may rotate. Turbine blades 14 include root 20, airfoil 22, and platform 24. Root 20 is shaped to mate with one of recesses 16 of disk 12 (such as with a fir tree configuration, as shown). Airfoil 22 extends from disk 12 along radial centerline 25. Airfoil 22 includes pressure side wall 26 and suction side wall 28. Platform 24 rests against the outer circumference of disk 12 and provides side-to-side stability to airfoil 14. Turbine blade 14 can be made using conventional manufacturing techniques, such as by investment casting.

Figure 2:
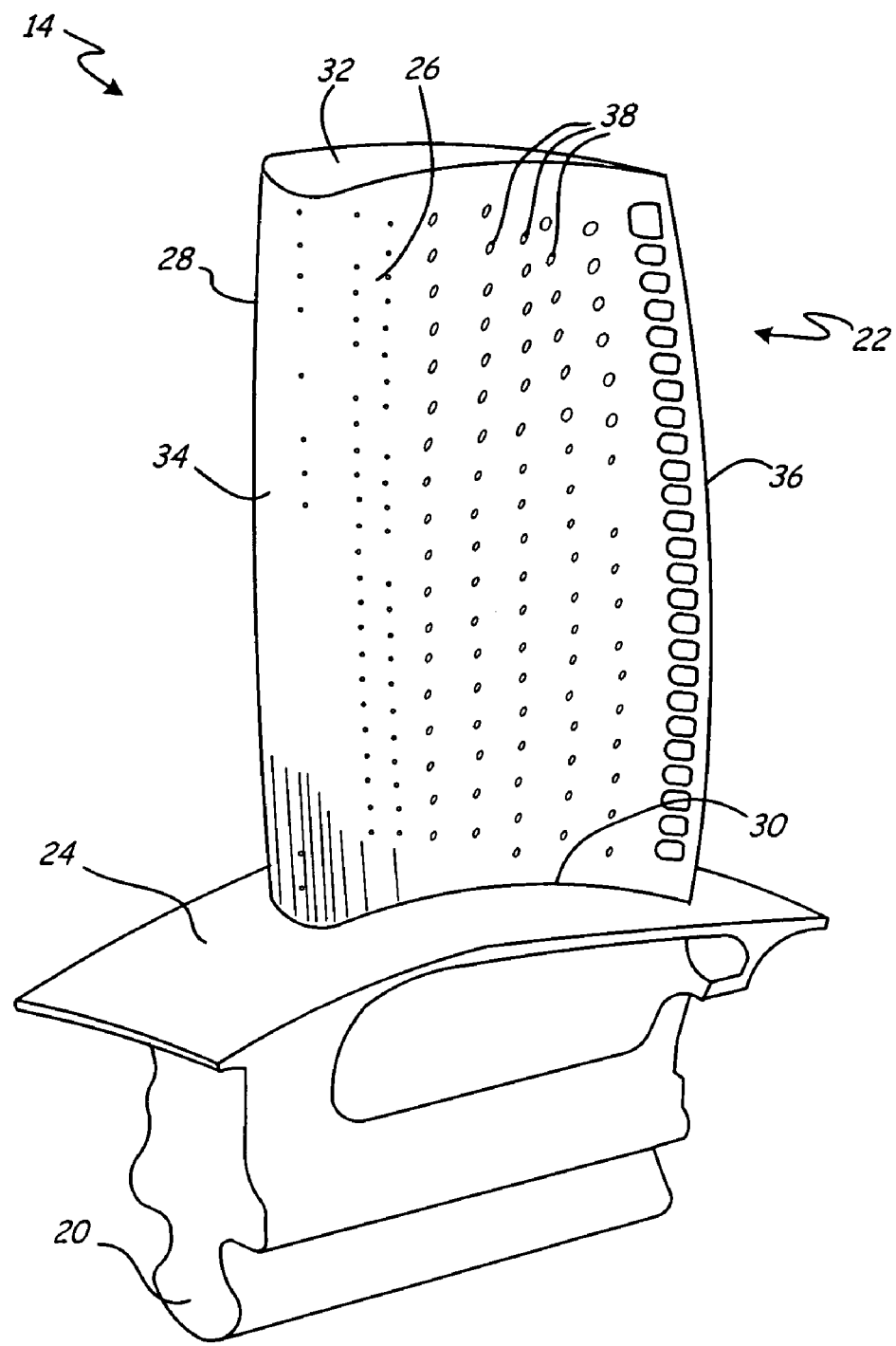
FIG. 2 is a perspective view of a turbine blade.

In operation, turbine rotor assembly 10 rotates along rotational centerline 18 as hot gases pass by airfoils 14. The high temperature of the gases cause turbine blades 14 to heat up. In order to meet desired durability requirements, the turbine blade must be kept below a maximum temperature. To do so, cooling air at a temperature less than the temperature of the hot gases is routed through turbine rotor assembly 10. Cooling air is then directed into root 20 of turbine blade 14. The cooling air passes through cooling channels and exits through film holes in side walls 26 and 28 (as shown in FIG. 2) As the cooling air exits the film holes, it forms a film layer of cooling air over turbine blade 14. The film layer cools and insulates the blade from the hot gases passing by.

FIG. 2 is a perspective view of turbine blade 14. Turbine blade 14 includes root 20, airfoil 22, and platform 24. Airfoil 22 includes base 30, tip 32, leading edge 34, and trailing edge 36. Suction side wall 26 and pressure side wall 28 extend between base 30 and tip 32 and meet at leading edge 34 and trailing edge 36. Film holes 38 extend through pressure side wall 26 and suction side wall 28 through which cooling air can pass from inside airfoil 22 to outside airfoil 22, thereby creating an insulating film of cooling air along the surface of side walls 26 and 28 to cool and insulate turbine blade 14 from the hot gases.

Figure 3:
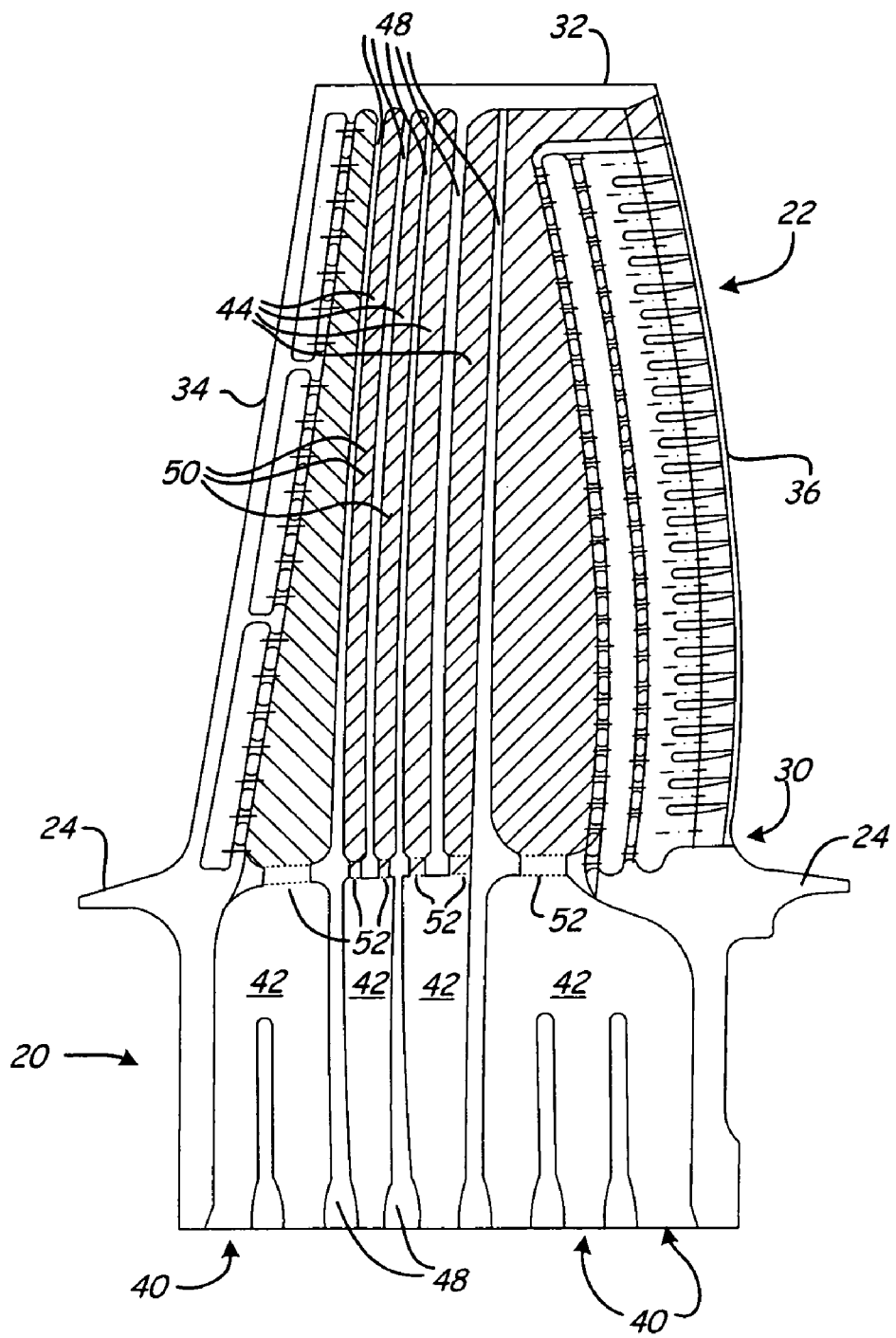
FIG. 3 is a cross-sectional view of a turbine blade.

FIG. 3 is a cross-sectional view of one embodiment of turbine blade 14. Turbine blade 14 includes root 20, airfoil 22, and platform 24. Airfoil 22 includes base 30, tip 32, leading edge 34 and trailing edge 36. Within turbine blade 14 are a plurality of ribs 48 extending from base 30 to tip 32 (some extending from root 20 to tip 32) and between side walls 26 and 28, which form barriers between cooling channels 40 to direct the flow of cooling air within turbine blade 14. Cooling channels 40 include root cooling channels 42 and airfoil cooling channels 44. Within cooling channels 44 are a plurality of trip strips 50 attached to the interior surface of one or both of side walls 26 and 28.

Cooling channels 40 extend radially within turbine blade 14, in a direction parallel with radial centerline 25 shown in FIG. 1. Cooling channels 40 include root cooling channels 42 and airfoil cooling channels 44, which are separated by pre-meter orifices 52. Cooling channels 44 may have any desired cross-sectional shape, such as circular, rectangular, triangular, or the like. The desired shape and size will vary depending on the particular operating specifications. In addition, it may be desirable for cooling channels 44 to taper from base 30 to tip 32 (such that the cross-sectional area decreases from base 30 to tip 32) to maintain the desired pressure within cooling channel 44 as cooling air escapes from film holes 38.

Pre-meter orifices are disposed between cooling channels 42 and 44 to control the air flow into cooling channel 44. The air flow into cooling channel 44 can be adjusted by adjusting the size of pre-meter orifice 52. The smaller the cross-sectional area of pre-meter orifice 52, the less cooling air that will be able to flow into cooling channel 44. The term "meter" means to set the flow of cooling air from a film hole to an appropriate amount. The term "pre-meter" means that orifice 52 is providing a rough or approximate air pressure within cooling channel 44 to roughly regulate the flow of cooling air through film holes 38.

A cross-sectional area of each pre-meter orifice 52 is less than the cross-sectional area of the associated cooling channel 44 at base 30. The difference in cross-sectional area between pre-meter orifice 52 and cooling channel 44 at base 30 causes a pressure drop to occur from cooling channel 42 to cooling channel 44. The reduced pressure in cooling channels 44 means that larger film holes 38 can be used, without overcooling the engine. In particular, the cooling air flow out of film holes 38 can be areas of cooling channels 40, and the cross-sectional areas of film holes 38 (shown in FIG. 2) to provide the appropriate amount of cooling air to specific areas of turbine blade 14. This is discussed in more detail with reference to FIG. 4.

Trip strips 50 are disposed within cooling channels 44 at an angle that is skewed relative to the cooling air flow direction. Preferably, trip strips 50 are oriented at an angle of approximately 45° to the flow direction of the cooling air. Trip strips add turbulence to the cooling air flow, which increases the heat transfer coefficient inside cooling channels 44, thereby improving the heat transfer from airfoil 22 to the cooling air.

In operation, cooling air enters cooling channels 40 of turbine blade 14 at root 20. The cooling air flows from root 20, through pre-meter orifices 52, into the base of airfoil 22, and is then directed toward tip 32. As the cooling air flows from base 30 to tip 32 within cooling channels 40, some of the cooling air escapes through film holes 38. Once cooling air has escaped from film holes 38, the air flows along side walls 26 or 28 and forms a film layer of cooling air over the surface of airfoil 22. This film layer cools airfoil 22 and also insulates airfoil 22 from the hot gases passing by. In this way, turbine blade 14 is kept below the desired temperature to maintain the life and durability of the blade within the gas turbine engine.

Figure 4:
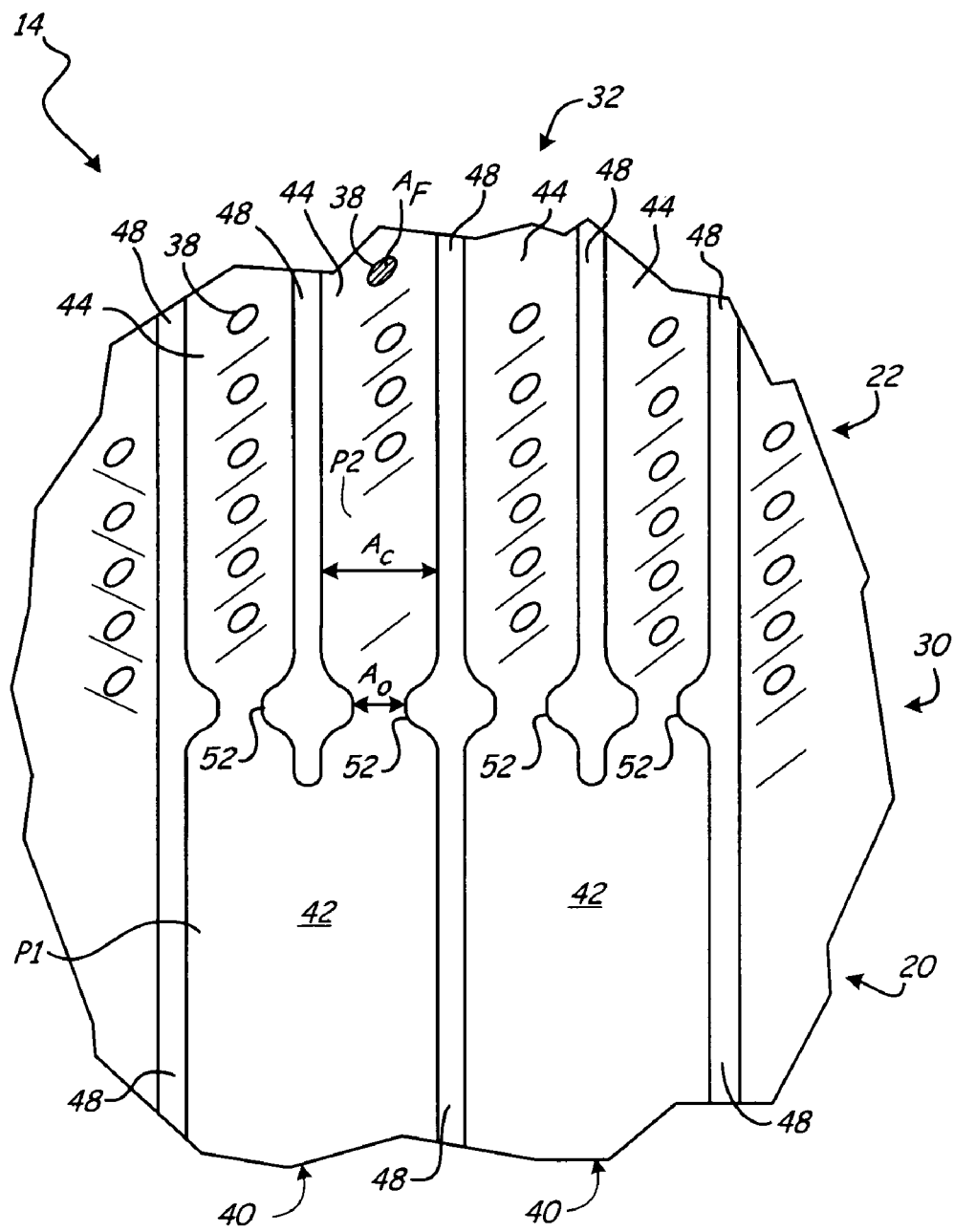
FIG. 4 is a magnified cross-sectional view of the turbine blade.

FIG. 4 is a magnified cross-sectional view of one embodiment of the turbine blade including film holes 38, cooling channels 40, and pre-meter orifices 52. One of the difficulties encountered with conventional turbine blade designs was that the flow of cooling air from the film holes could not be adequately controlled. If too much cooling air is released from the film holes, the efficiency of the gas turbine engine is reduced because it overcools the combustion gases and also reduces the pressure within the engine. However, an insufficient flow will not adequately cool the turbine blade, resulting in reduced longevity and durability of the turbine blade.

Conventional turbine blade designs with radial cooling channels were largely abandoned due to the fact that they would either overcool the engine or become clogged with sand or other debris. Gas turbine engines are often used on aircraft or other machines that operate in sandy or dusty environments. In order to avoid overcooling, conventional systems used very small film hole sizes that would limit the flow of cooling air. However, these film hole sizes were so small that they could become clogged with sand and other debris. Once the film holes were clogged, the film holes released little or no cooling air. As a result, the cooling system became ineffective in cooling turbine blade 14. Another problem with conventional turbine blades that utilized small film holes was that the entire pressure drop occurred at the film hole. As a result, the cooling air flow out of the film hole had a high velocity. The high velocity cooling air must mix with the external air and hot gases resulting in large mixing losses. The mixing loses lead to aerodynamic inefficiency of the turbine blade.

Therefore, it was believed that large film hole sizes had to be used to avoid clogging and reduce the velocity of exiting cooling air, which would result in overcooling of the gas turbine engine. As a result, turbine blade designs with radial cooling channels were largely abandoned in favor of complex cooling channel designs, such as those having serpentine cooling channels.

One of the benefits of radial cooling channels, as opposed to serpentine cooling channels or other complex configurations is that the flow of cooling air within radial cooling channels is much easier to predict and calculate. The fast rotation of turbine rotor assembly 10 (shown in FIG. 1) generates large rotational forces that act upon turbine blade 14 as well as the cooling air contained inside. Radial cooling channels use the radial forces to help push cooling air from base 30 to tip 32 of airfoil 22. Serpentine designs attempt to work against the rotational forces by forcing cooling air through passages oriented opposite the rotational forces (in the direction from tip 32 to base 30). This greatly increases the complexity of predicting the flow of cooling air within the turbine blade.

This embodiment provides radial cooling channels 40 that eliminate the difficulties experienced with more complex designs, but also overcomes the problems experienced with conventional radial cooling designs. Specifically, pre-meter orifices 52 provide a means of controlling the flow of cooling air into cooling channel 44 to avoid overcooling the engine and to avoid undercooling turbine blade 14.

The cross-sectional area ($A_C$) of each airfoil cooling channel 44 at base 30 is greater than the cross-sectional area ($A_O$) of the respective adjacent pre-meter orifice. The change in cross-sectional area results in a pressure change as cooling air passes through pre-meter orifice 52 into base 30 of cooling channel 42. As a result, the pressure P2 at base 30 of cooling channel 44 is less than the pressure P1 within cooling channel 40 within root 20. As a result of the reduced pressure in cooling channels 44, film holes 38 (with cross-sectional area $A_F$) can be sized large enough to avoid clogging by sand or other debris.

The size and shape of pre-meter orifices 52 will vary depending on the specific requirements of the system, and the requirements of the specific cooling channel. The shape of a cross-section of pre-meter orifice 52 can be designed to control the direction of cooling air flow entering cooling channel 42. For example, a triangular cross-section may be used to direct the air flow more to one side than the other side. An endless variety of cross-sectional shapes are contemplated. The cross-sectional area of pre-meter orifice is designed to provide the appropriate amount of cooling air to and out of film holes 38. The cross-sectional area will therefore depend on numerous variables including the temperature of the hot gases outside turbine blade 14, the temperature of the cooling air, the number and size of film holes being supplied by the respective pre-meter orifice, the rotational speed of the turbine rotor, the desired thrust of the gas turbine engine, and other variables that will be understood by one skilled in the art of turbine blade design.

Although the present invention has been described with reference to preferred embodiments, workers skilled in the art will recognize that changes may be made in form and detail without departing from the spirit and scope of the invention.

The invention claimed is:

1. A turbine blade comprising:
   an airfoil having a leading edge, a trailing edge, a first side wall, a second side wall, a base region, and a tip region;
   a plurality of cooling channels radially extending within the airfoil for directing cooling air through the airfoil, each cooling channel having a first end and a second end and a cross-sectional area at the first end, wherein each cooling channel directs cooling air in a radially outward direction from the base region to the tip region so that air flows through the airfoil without taking a serpentine path; and
   an orifice adjacent the first end of each cooling channel, a cross-sectional area of the orifice being less than the cross-sectional area of the first end of the adjacent cooling channel.

2. The turbine blade of claim 1, further comprising film holes extending from the cooling channels through at least one of the side walls.

3. The turbine blade of claim 2, wherein the film holes each have a cross-sectional area less than the cross-sectional area of the first end of the cooling channel from which the film hole extends.

4. The turbine blade of claim 1, further comprising ribs extending radially within the airfoil between the first side wall and the second side wall and adjacent the cooling channels.

5. The turbine blade of claim 1, further comprising a platform between the airfoil and the root.

6. The turbine blade of claim 1, wherein the cross-sectional area at the first end of the cooling channel is greater than the cross-sectional area at the second end of the same cooling channel.

7. The turbine blade of claim 1, further comprising:
   a root extending substantially parallel with the airfoil; and
   a platform connected between the airfoil and the root.

8. The turbine blade of claim 7, the root comprising a root cooling channel extending radially within the root for directing cooling air into the airfoil.

9. A turbine rotor assembly comprising:
   a disk having a plurality of recesses circumferentially disposed around the disk;
   a plurality of turbine blades having a root, a platform, and an airfoil, wherein the root is shaped to mate with one of the recesses, and wherein the airfoil comprises:
   a plurality of radial cooling channels, each cooling channel having a first end and a second end, and a cross-sectional area at the first end, wherein each cooling channel directs cooling air in a radially outward direction from a base region of the airfoil to a tip region of the airfoil so that air flows through the airfoil without taking a serpentine path; and
   an orifice adjacent each cooling channel and having a cross-sectional area, wherein the cross-sectional area of the orifice is less than the cross-sectional area of the first end of the adjacent cooling channel.

10. The turbine rotor assembly of claim 9, the airfoil further comprising:
    a first side wall;
    a second side wall opposite the first side wall; and
    ribs extending radially within the airfoil between the first side wall and the second side wall and adjacent the cooling channels.

11. The turbine rotor assembly of claim 10, the airfoil further comprising a plurality of film holes in at least one of the first and second side walls and adjoining the cooling channels.

12. The turbine rotor assembly of claim 11, wherein the orifice has a cross-sectional area greater than a cross-sectional area of one of the film holes.

13. The turbine rotor assembly of claim 11, wherein the first ends of the cooling channels are at the base region, opposite the tip region, of the airfoil.

14. The turbine rotor assembly of claim 9, wherein the root comprises a radial cooling channel.

15. The turbine rotor assembly of claim 9, further comprising a plurality of trip strips within the cooling channels to increase the turbulence of the cooling air.

16. An airfoil for a turbine blade comprising:
    a plurality of radial cooling channels, wherein each cooling channel directs cooling air in a radially outward direction from a base region of the airfoil to a tip region of the airfoil so that air flows through the airfoil without taking a serpentine path;
    means for limiting cooling air flow into the cooling channels; and
    means for limiting cooling air flow from the cooling channels.

17. The airfoil of claim 16, wherein the means for limiting cooling air flow into the cooling channels are orifices.

18. The airfoil of claim 16, wherein the means for limiting cooling air flow from the cooling channels are film holes.

19. The airfoil of claim 16, further comprising ribs extending radially within the airfoil and adjacent the cooling channels.

20. The airfoil of claim 16, further comprising:
    a first side wall having a leading edge and a trailing edge;
    a second side wall opposite the first side wall and connected to the first side wall at the leading edge and the trailing edge; and
    ribs between the first side wall and the second side wall and extending radially within the airfoil to define the cooling channels.

* * * * *